(12) United States Patent
Kamath et al.

(10) Patent No.: US 10,305,749 B2
(45) Date of Patent: May 28, 2019

(54) LOW LATENCY FLOW CLEANUP OF OPENFLOW CONFIGURATION CHANGES

(71) Applicant: International Business Machines Corporation, Armonk, NY (US)

(72) Inventors: Dayavanti G. Kamath, Bangalore (IN); Tejas S. Nevrekar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/919,914

(22) Filed: Mar. 13, 2018

(65) Prior Publication Data

US 2018/0205614 A1 Jul. 19, 2018

Related U.S. Application Data

(63) Continuation of application No. 14/805,594, filed on Jul. 22, 2015, now Pat. No. 9,948,518.

(51) Int. Cl.
*H04L 12/24* (2006.01)
*H04L 12/721* (2013.01)

(52) U.S. Cl.
CPC .......... *H04L 41/12* (2013.01); *H04L 41/0672* (2013.01); *H04L 45/38* (2013.01); *Y02D 30/30* (2018.01)

(58) Field of Classification Search
CPC ..... H04L 41/12; H04L 41/0672; H04L 45/38; Y02D 30/30
See application file for complete search history.

(56) References Cited

U.S. PATENT DOCUMENTS 8,638,789 B1 * 1/2014 Pani .............. H04L 12/185 370/390
8,665,699 B2 3/2014 Bellagamba et al.
(Continued)

FOREIGN PATENT DOCUMENTS

WO 2014046875 A1 3/2014
WO 2014131429 A1 9/2014

OTHER PUBLICATIONS

Thorat et al., "Optimized Self-healing Framework for Software Defined Networks", IMCOM '15, Jan. 8-10, 2015, Bali, Indonesia, Copyright 2015, ACM 978-1-4503-3377-1/15/01, pp. 1-6, <http://dx.doi.org/10.1145/2701126.2701235>.
(Continued)

*Primary Examiner* — Philip J Chea
*Assistant Examiner* — Robert B McAdams
(74) *Attorney, Agent, or Firm* — Daniel R. Simek

(57) ABSTRACT

A controller of a software-define network receives a notification of a change to a configuration of data delivery devices of the network. In response, the controller determines whether flows of respective flow tables of the data delivery devices are affected by accessing flow mappings maintained in a memory of the controller. The respective flow tables of the data delivery devices affected by the configuration change include a pattern of information fields and actions that corresponds to a pattern of information fields and actions of the flow mappings in the memory of the controller. The controller sends instructions to the affected data delivery devices to perform an asynchronous activity on the respective flow tables that includes a cleanup of the flows of the respective flow tables of the affected data delivery devices, performed in repetitive sweeps of the one or more data delivery devices, until completion of the cleanup.

20 Claims, 4 Drawing Sheets

(56) References Cited

U.S. PATENT DOCUMENTS

| | | | | |
|---|---|---|---|---|
| 8,693,374 | B1* | 4/2014 | Murphy | H04L 12/28 370/255 |
| 9,350,661 | B2* | 5/2016 | Murphy | H04L 47/12 |
| 2011/0286324 | A1* | 11/2011 | Bellagamba | H04L 41/0677 370/219 |
| 2011/0317559 | A1* | 12/2011 | Kern | H04L 45/02 370/235 |
| 2012/0147898 | A1* | 6/2012 | Koponen | H04L 41/0893 370/422 |
| 2013/0058350 | A1* | 3/2013 | Fulton | H04L 41/0896 370/400 |
| 2013/0114615 | A1* | 5/2013 | Suemitsu | H04L 47/2441 370/401 |
| 2013/0163426 | A1* | 6/2013 | Beliveau | H04L 67/327 370/235 |
| 2015/0023147 | A1* | 1/2015 | Lee | H04L 45/38 370/216 |
| 2015/0326425 | A1* | 11/2015 | Natarajan | H04L 41/0654 370/216 |
| 2016/0028625 | A1* | 1/2016 | Hari | H04L 45/74 370/392 |
| 2016/0072762 | A1* | 3/2016 | Liang | H04L 45/56 709/245 |

OTHER PUBLICATIONS

IBM, "Downloading IBM SDN for Virtual Environments", made publicly available on Aug. 20, 2014, provided by inventors on Dec. 19, 2014, Grace Period Disclosure, pp. 1-3, <http://www-01.ibm.com/support/docview.wss?uid=isg3T4000047>.

IBM, "Software Defined Network for Virtual Environments User Guide, Version 1.2 for OpenFlow Edition", Aug. 15, 2014, pp. 1-242, User Guide download file name: UG_SDN-VE_OpenFlow_Edition_1-2.pdf, Grace Period Disclosure, <http://www-01.ibm.com/support/docview.wss?uid=isg3T7000691>.

IBM, "Software Defined Networking for Virtual Environment, OpenFlow Edition, when used with OpenFlow-enabled switches, provides for centralized and simplified programmable networking", IBM United States Software Announcement 214-032, Jan. 28, 2014, pp. 1-13, <http://www-01.ibm.com/common/ssi/cgi-bin/ssialias?infotype=an&subtype=ca&htmlfid=897/ENUS214-032>.

"Method for atomic processing of a group of OpenFlow flows", An IP.com Prior Art Database Technical Disclosure, Authors et al.: Disclosed Anonymously, IP.com No. IPCOM000235066D, Feb. 26, 2014, pp. 1-5, <http://ip.com/IPCOM/000235066>.

U.S. Appl. No. 14/805,594, filed Jul. 22, 2015.

List of IBM Patents or Patent Applications Treated as Related (Appendix P), filed herewith, 2 pages.

* cited by examiner

LOW LATENCY FLOW CLEANUP OF OPENFLOW CONFIGURATION CHANGES

STATEMENT REGARDING PRIOR DISCLOSURES BY THE INVENTOR OR A JOINT INVENTOR

The following disclosure(s) are submitted under 35 U.S.C. § 102(b)(1)(A):

DISCLOSURE(S)

(1) Downloading IBM SDN for Virtual Environments; IBM SDN VE OpenFlow Edition. Downloadable files, Aug. 20, 2014. Located at URL: http://www-01.ibm.com/support/docview.wss?uid=isg3T4000047
(2) IBM Software Defined Network for Virtual Environments User Guide, Version 1.2 for OpenFlow Edition; IBM Corporation, Aug. 15, 2014. User Guide download file name: UG_SDN-VE_OpenFlow_Edition_1-2.pdf. Located at URL: http://www-01.ibm.com/support/docview.wss?uid=isg3T7000691

BACKGROUND OF THE INVENTION

The present invention relates generally to the field of network management, and more particularly to a software defined network service for modifying network flows based on network events.

Software-defined networking (SDN) is a computer networking approach that enables network service management through abstraction of lower-level functionality. This is done by decoupling the system that makes decisions about where traffic is sent (the control plane) from the underlying systems that forward network traffic to the selected destination (the data plane).

SDN requires some method for the control plane, which includes applications and performs software control of network activity, to communicate with the data plane, also known as the forwarding plane, which performs the actual distribution activity of network data packets. One such method involves an open standard protocol providing a means for server-based control of network packet delivery without requiring vendors to expose the internal workings of their network devices. OpenFlow is a communications protocol that provides an application programming interface (API) that gives a server-based controller access to the forwarding planes across a network of switches, routers, and access points (OpenFlow is a trademark of Open Networking Foundation non-profit corporation, OREGON U.S.A.). OpenFlow enables the control plane of an SDN network architecture to have a comprehensive view of the network configuration, and enables controllers to send instructions to OpenFlow (OF) devices that define the path of delivering data packets through the OF devices of the network. The separation of the control plane from the data plane allows for more sophisticated traffic management than is feasible using access control lists (ACLs) and routing protocols at the switch or router level.

The controller instruction to the OF device is received and results in generation of an entry of a flow in a data structure referred to as a flow table of the OF device. A flow is an instruction generated by services of an SDN server working in conjunction with an SDN controller to deliver the instructions to OF devices on how to forward data packets that are received. Each flow has two components, a match and a set of actions. Each match describes a set of fields that are compared with the corresponding fields in the data packet. Each field may have a specific value or a wildcard value. An OF rule with a specific set of field values, applies to any data packet received by the OF device having a matching set of field values in its header. The set of field values is referred to as a "pattern" and it represents a pattern of data traffic which are applied to matching data packets. SDN services are applications providing control plane functionality, and run in the context of the SDN controller. SDN services receive and accept configurations of the OF devices of the network, and translates the configuration into OpenFlow rules that are programmed, delivered and stored in flow tables of the OF devices. If the configuration input to the services were to change, the services compute a new set of OF rules, which are delivered and stored on the OF devices.

SUMMARY

Embodiments of the present invention disclose a method, computer program product, and system for managing flows of a software-defined network. The method for managing flows of a software-defined network provides for a controller to receive a notification of a change to a configuration of a plurality of data delivery devices of the software-defined network. Responsive to receiving the notification of the change to the configuration of one or more data delivery devices of the plurality of data delivery devices, the controller determines whether one or more flows of respective flow tables of the plurality of data delivery devices are affected as a result of the change to the configuration, by accessing flow mappings maintained in a memory of the controller, in which the respective flow tables of the one or more data delivery devices that are affected by the change to the configuration include a pattern of information fields and actions that corresponds to a pattern of information fields and actions of the flow mappings maintained in the memory of the controller, and the controller sends instructions to the one or more data delivery devices that are affected by the change to the configuration to perform an asynchronous activity on the respective flow tables of the one or more data delivery devices, wherein the asynchronous activity includes a cleanup of the one or more flows of the respective flow tables of the one or more data delivery devices, performed in repetitive sweeps of the one or more data delivery devices, until completion of the cleanup.

DETAILED DESCRIPTION

Figure 1:
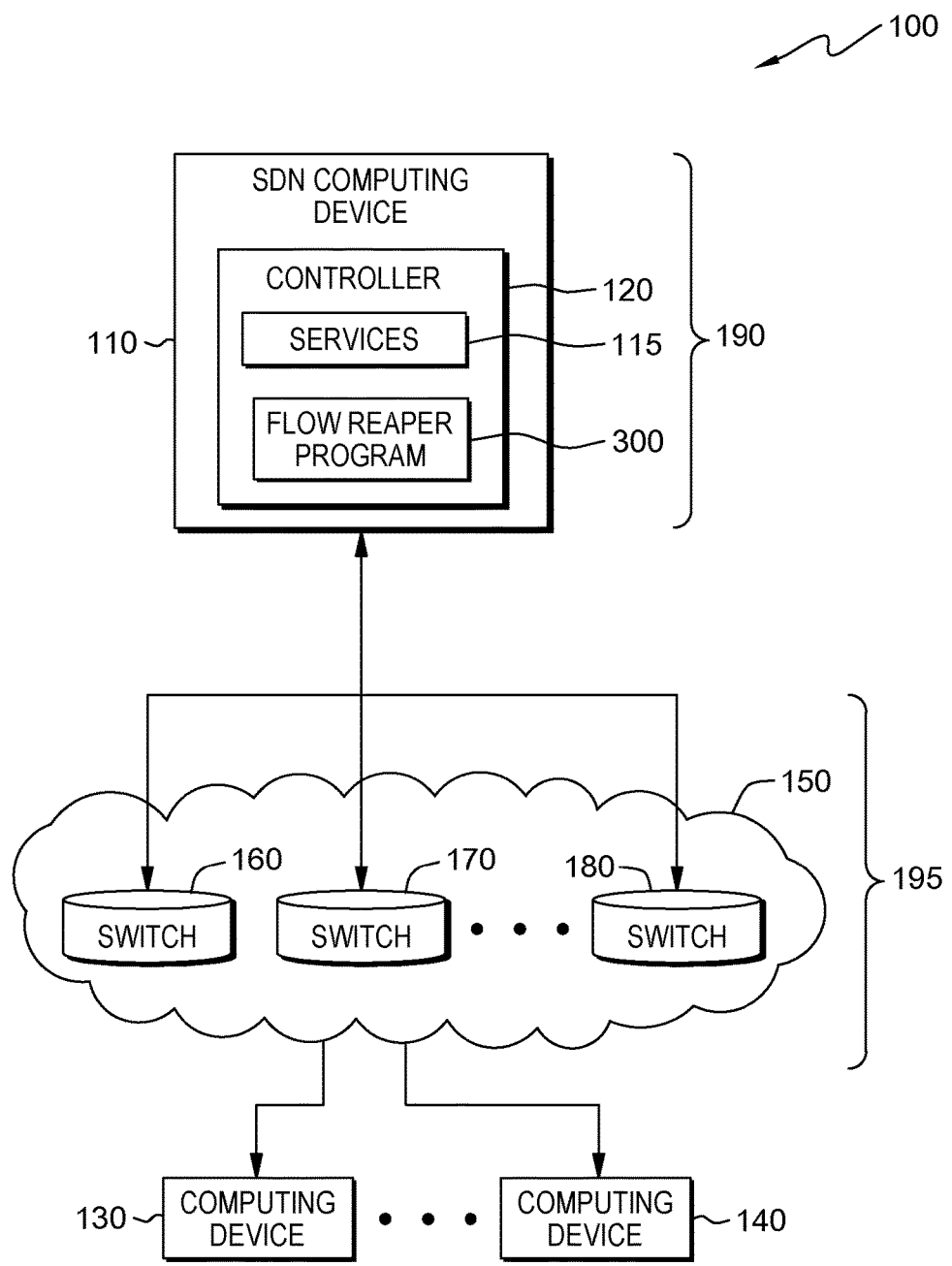
FIG. 1 is a functional block diagram illustrating a distributed network processing environment, in accordance with an embodiment of the present invention.

Embodiments of the present invention recognize that failed links within an SDN network require generation of an alternative path, or failover, to continue network data packet delivery, and re-establish flows in response to failed links that are returned back to service; also referred to as failback. Similarly, networks may experience configuration changes by the removal, replacement, or addition of host systems and/or network routing devices, which requires addition, modification, or cleanup of flows. Corrective techniques may include use of wild-card flow delete instructions by the affected routing device(s), and maintenance activity by individual services of programmed flows and network event correlations to the flows. Wild-card deletes of flows are unable to filter activity by output port, due to protocol limitations, and maintaining flow listings and correlations of network events adds increased complexity, adds to latency, and creates unpredictable outcomes, based on ownership issues of affected flows that are derived from multiple services.

Embodiments of the present invention provide a method, computer program product, and computer system for a low-latency, asynchronous, uniformly available flow reaper service, used by one or a combination of data packet services of an SDN network. The flow reaper service is applied to cleanup or modify flow paths affected by link failover and link failback, and cleanup of flows affected by configuration changes. Network devices include switches, routers, and other OpenFlow devices, and hereafter are collectively referred to by the term "switch", or the plural "switches".

Embodiments of the present invention recognize that flows include two parts; a set of field values, or a pattern, and actions-to-be-taken on data packets found to have a matching pattern. Flows are entered into a flow mapping table of an OF device, otherwise referred to as a flow table, and a reaper service, as a sub-component of the controller that operates on an SDN computing device, maintains an index mapping of the flows affected by each value of a type of flow qualifier (a pattern), such that an index entry that is matched by a src-mac (source-media access control) value contains all flows that have a matching src-mac value appearing in a field of the flow qualifier. Embodiments of the present invention include a reaper service, referred to herein as flow reaper program 300, which applies some of the matching fields of flows and their respective corresponding actions, to construct an index of flows for each of the OF devices of the SDN, and stores the index in a local cache of the SDN controller.

In some embodiments of the present invention, the SDN is enabled with an OpenFlow protocol which provides API connections between a control plane and a data plane, also referred to as a forwarding plane, of a data transport network. In a classical router, or switch, the fast packet forwarding plane and the high level routing decisions made within the control plane occur on the same device. An OpenFlow switch separates these two functions with the forwarding plane remaining on the switch, while high-level routing decisions are moved to a separate controller. In some embodiments the controller includes service applications and a reaper service, operating on a computing device, such as a server. The OpenFlow switch and controller communicate via the OpenFlow protocol, which defines messages, such as packet-received, send-packet-out, modify-forwarding-table, and get statistics. The data plane of an OpenFlow switch includes a flow table with each flow table entry containing a set of packet fields used to match received packets, and an action to be taken on the received packet upon a match between the packet fields and the flow table entry.

Embodiments of the present invention provide a reaper service (flow reaper program 300, to be discussed later, in detail), performing a reactive cleanup of flows resulting from detected changes in an SDN topology configuration of data packet delivery, based on a flow index cache maintained by the reaper service. In some embodiments of the present invention, link layer discovery protocol packets are sent by the controller of the SDN network to discover changes in the topology configuration. In some embodiments in which a link failure (failover) is detected, affected flows are modified rather than cleaned up, based on flow indexes maintained in a flow cache and alternative port information received by flow reaper program 300. The alternative port information is received by flow reaper program 300 along with a cleanup request, from SDN services reacting to the detection of the link failure. This enables the reaper service to perform a modification of affected flows as opposed to merely deleting flows correlating to the failed link, thus reducing latency. In other embodiments, in response to determining configuration changes to a service of the network, the reaper service is triggered, operating in the background, to send flow deletions and cleanup instructions to SDN delivery devices to delete flows having mac values of either a source or destination, which are affected by the configuration change.

The SDN circumstances in which cleanup of flows are performed include cases in which a change of network hosts is discovered, such as the addition or removal of a server or other computing device that is part of the network, a delivery device is added or removed, or an existing host ceases to exist. Cleanup of flows is also needed in cases in which a logical network entity is reconfigured, for example, if the MAC or IP address of a network port is changed, added, or deleted. If the path to a host has changed or a link of a path fails, causing the output action to change or a redefinition of a flow, cleanup of previous flows are needed.

The present invention will now be described in detail with reference to the Figures. FIG. 1 is a functional block diagram illustrating a distributed network processing environment, generally designated 100, in accordance with an embodiment of the present invention. Distributed network processing environment 100 includes SDN computing device 110, which is depicted as hosting controller 120. Controller 120 includes services 115 and flow reaper program 300, which, along with SDN computing device 110 are all components of control plane 190. Distributed network processing environment 100 also includes switches 160, 170, and 180, depicted as part of network 150, all of which comprises forwarding plane 195, and network 150 is also connected to computing devices 130 and 140.

Computing devices 130 and 140 are user computing devices connected to network 150 and capable of sending and receiving data packets within distributed network processing environment 100. In some embodiments computing devices 130 and 140 may be a laptop computer, a tablet computer, a netbook computer, a personal computer (PC), a desktop computer, a personal digital assistant (PDA), a smart phone web server, a mobile computing device, or any other electronic device or computing system capable of receiving and sending data. In other embodiments, computing devices 130 and 140 represent virtual computing devices of a computing system utilizing multiple computers as a server system, such as in a cloud computing environment. In yet other embodiments, computing devices 130 and 140 represent access points to a computing system utilizing clustered computers and components (e.g., database server computers, application server computers, etc.) that act as a single pool of seamless resources when accessed within distributed network processing environment 100. Computing devices 130 and 140 may include internal and external hardware components, as depicted and described with reference to FIG. 4.

Forwarding plane 195 is one of two partitions of distributed network processing environment 100. Forwarding plane 195, also referred to as a data path, or data plane, includes OF devices, such as switches 160, 170, and 180, and flow tables within switches 160, 170, and 180, which include packet header information associated with flow matching and actions enabling the forwarding of matched packets to designated ports of switches within the network. Forwarding plane 195 receives decision and command instructions from controller 120 of control plane 190.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between computing devices 130, and 140, switches 160, 170, and 180, controller 120, flow reaper program 300, SDN computing device 110, in accordance with embodiments of the present invention.

Switches 160, 170, and 180 represent a plurality of switches (e.g. not limited to three), included in distributed network processing environment 100. Switches 160, 170, and 180 are OpenFlow devices, sometimes referred to as delivery devices, which include the OpenFlow protocol and enable an SDN architecture of distributed network processing environment 100. Although embodiments of the present invention apply to any OpenFlow capable device, the term "switch" will hereafter be used for simplicity, and not imply limitation. The switch creates flow entries in its flow table based on the commands received from controller 120, and applies the entries to match a pattern specified in a flow. In response to matching a pattern, the switch performs an action corresponding to the pattern, which was designated by the controller command and entered into the flow table by the switch. Link failures or changes to the network configuration require modifications or replacement of flow entries and cleanup of previous configuration flow entries. In response to receiving commands from services 115, through controller 120, flow reaper program 300 performs cleanup services for the previous flow entries in the flow mapping tables of affected network switches, which are superseded by the changed flow entries.

Control plane 190 is one of two partitions of distributed network processing environment 100. Control plane 190, also referred to as a control path, includes a computing device hosting controller 120, such as SDN computing device 110, and applications that perform various controlling, monitoring, and tracking functions of traffic flow through switches within the network, such as services 115. Components of control plane 190 perform remote administration of decisions associated with the data packet forwarding tables of switches in the network. Components of control plane 190 perform the decision making and command generating tasks supporting network traffic flow, and provide specific command instructions to forwarding plane 195 for executing data packet traffic flow. In some embodiments of the present invention, OpenFlow protocol is used to enable control plane 190 communication with forwarding plane 195 switches.

SDN computing device 110 is a computing device that includes controller 120 and is capable of operating flow reaper program 300, within distributed network processing environment 100. In some embodiments SDN computing device 110 may be a management server, a web server, a mobile computing device, or any other electronic device or computing system capable of receiving and sending data. In other embodiments, SDN computing device 110 may represent a virtual computing device of a computing system utilizing multiple computers as a server system, such as in a cloud computing environment. In another embodiment, SDN computing device 110 may be a laptop computer, a tablet computer, a netbook computer, a personal computer (PC), a desktop computer, a personal digital assistant (PDA), a smart phone, or any programmable electronic device capable of performing the operational steps of flow reaper program 300, via network 150. In another embodiment, SDN computing device 110 represents a computing system utilizing clustered computers and components (e.g., database server computers, application server computers, etc.) that act as a single pool of seamless resources when accessed within distributed network processing environment 100. SDN computing device 110 may include internal and external hardware components, as depicted and described with reference to FIG. 4.

Services 115 represents one or more SDN applications that provide control plane functionality, which may be, for example, multi-tenancy functions or policy functions. Each of the SDN applications performs as a service in the context of controller 120. Services 115 receives configuration and topology information of the SDN and translates the information into OpenFlow rules that are sent as instructions by controller 120 to switches, such as switches 160, 170 and 180. As input regarding changes to the configuration or topology of the SDN is received by services 115, services 115 re-computes sets of OpenFlow rules to be programmed and entered into the flow tables of the SDN switches. In some embodiments of the present invention, in response to detecting a link failure, one or more services of services 115 includes alternate port information to be used on affected switches, included within a request to flow reaper program 300 to perform a cleanup of the previous flows of affected switches. This enables flow reaper program 300 to perform a modification of flows as opposed to merely deleting the previous flows affected by the link failure.

Controller 120 is an SDN controller that is remote from switches 160, 170, and 180, and depicted as being hosted in SDN computing device 110. Controller 120 is included in control plane 190 of distributed network processing environment 100. Controller 120 includes highly available, separate management connections to all switches in the network, thus the controller has a view of all switches, all ports of the switches, and configuration mechanisms connecting the switches within the network path. The controller enables network traffic by sending service-generated commands to the switches regarding the action to take, based on particular data packet qualifier values. In the event that a switch in the network receives a packet for which it has no matching flow entries in its flow table, the packet is sent and received by controller 120. Controller 120, through services 115, determines the action to be taken on the packet, such as whether a flow entry is added to the flow table of an appropriate switch, directing how the switch is to forward the packet and similar packets in the future, or controller 120 may determine to drop the packet. Controller 120 is depicted as including flow reaper program 300 and services 115 as operational sub-components of controller 120. By virtue of a complete view of the configuration of the network in control plane 190 and forwarding plane 195, controller 120 can determine when the network configuration changes, such as the addition or removal of hosts or switches made to the SDN.

Flow reaper program 300 (referred to above as a reaper service), performs a low-latency, asynchronous, uniformly available flow cleanup service, used by one or a combination of data packet services of an SDN network. Flow reaper program 300 is triggered by commands received from controller 120, following controller 120's detection of a network event of a failed network link, or changes to the network configuration, and notification of the network event to services 115. Flow reaper program 300 generates and accesses indexes of flow mappings of the SDN network switches that are maintained by flow reaper program 300 in cache storage.

Flows are instructions given by the SDN controller to a switch, defining the path by which data packets are forwarded or delivered to a next point in the network. In response to service configuration changes or network topography changes, flow reaper program 300 is invoked to trigger flow deletion (cleanup) for the flows keyed by the mac (media access control) address of the changed device of the network topology, as a source or a destination. Thus, for the service experiencing changes, flow reaper program 300 is an asynchronous non-blocking operation and hence low latency, that runs in the background of operating an SDN network controller and network switches.

If a failed link is detected by controller 120 (which includes flow reaper program 300 as a sub-component), controller 120 notifies services 115 as to the condition of the link failure. The services of services 115 mark the change and apply the updated topology of the SDN marking the link as unavailable for any future request that needs flow programming. In response to the link failure, embodiments of the present invention do not require services 115 to keep track of flows that have been already programmed to the switches. The set of flows that are already programmed cannot be derived trivially from the event of the link failure. Knowledge of the responses of services 115 to the past receipt of different packets is needed to determine the flows affected by the link failure. This further emphasizes the importance of a "reactive" mode of controller operation in which the services in conjunction with controller 120 keep a minimum number of flows on each switch by only programming in reaction to an incoming packet. Thus the internal cache of indexes of flows are used by flow reaper program 300 to determine the affected flows.

For example, if a service of services 115 were to program a flow having a match of: {(src-ip=10.20.2.1; eth-type=ip); actions=[OUTPUT(port:1)]})]} on node n1, in which values of the match that include a source internet protocol (IP) address(src-ip), a network connection type (eth-type), and an output action to be taken at port 1, embodiments of the present invention add this flow to the cached index for node n1 and port 1. If a link with source or target as port 1 on node 1 were to fail, embodiments of the present invention quickly correlate and determine the impacted flows. Additionally, because the services may select the use of an alternate port on the switch, in some embodiments of the present invention, flow reaper program 300 receives the alternate port use information, along with the cleanup request from the server, and applies a modification of the existing flow to include the received alternate port, instead of merely deleting the previous flow from the switch.

If a configuration change is detected by controller 120, such as controller 120 sending LLDP packets out as a mechanism to determine existing edges in the SDN, and detecting differences between two subsequent responses, controller 120 communicates the change as an event of the network to services 115. In response, the services perform a re-computation of topology and flow programming affected by the change in topology, and triggers flow reaper program 300 to take an appropriate action (modify and/or cleanup) on reactive flows already programmed.

In some embodiments of the present invention, flow mappings include the delivery information of data packets of the source and destination ports of the switches within the SDN network. In some embodiments, flow reaper program 300 may receive a generated flow from a service of services 115 of the SDN network, whereas in other embodiments, multiple services may collaborate to generate one outcome flow. The life-cycle of such a flow is tracked by flow reaper program 300. Flow reaper program 300 maintains a mapping index of flows affected by each value of a type of flow qualifier that corresponds to a header pattern of data packets. The mapping index includes a flow qualifier value and a flow action. Thus, a map entry keyed by a src-mac value will contain all flows that have the src-mac value appearing in the qualifier or in the flow action.

In response to determining the mac address(es) as either a source or destination of a port failing to deliver packets, in some embodiments of the present invention, flow reaper program 300 sends commands to switches of the SDN that include the affected flows, to delete the affected flows from their respective flow tables. The flows are identified by matching the qualifier values of the affected flow to the index of flow mappings maintained by flow reaper program 300 in cache. In other embodiments in which the network change is detected to be a link failure, flow reaper program 300 receives alternate routing information from services 115, along with a cleanup command. The alternate routing information from services 115, along with the index of flow mappings maintained by flow reaper program 300, enables flow reaper program 300 to modify the affected flow(s) instead of deleting the affected flow(s) from the respective flow table(s).

Figure 2:
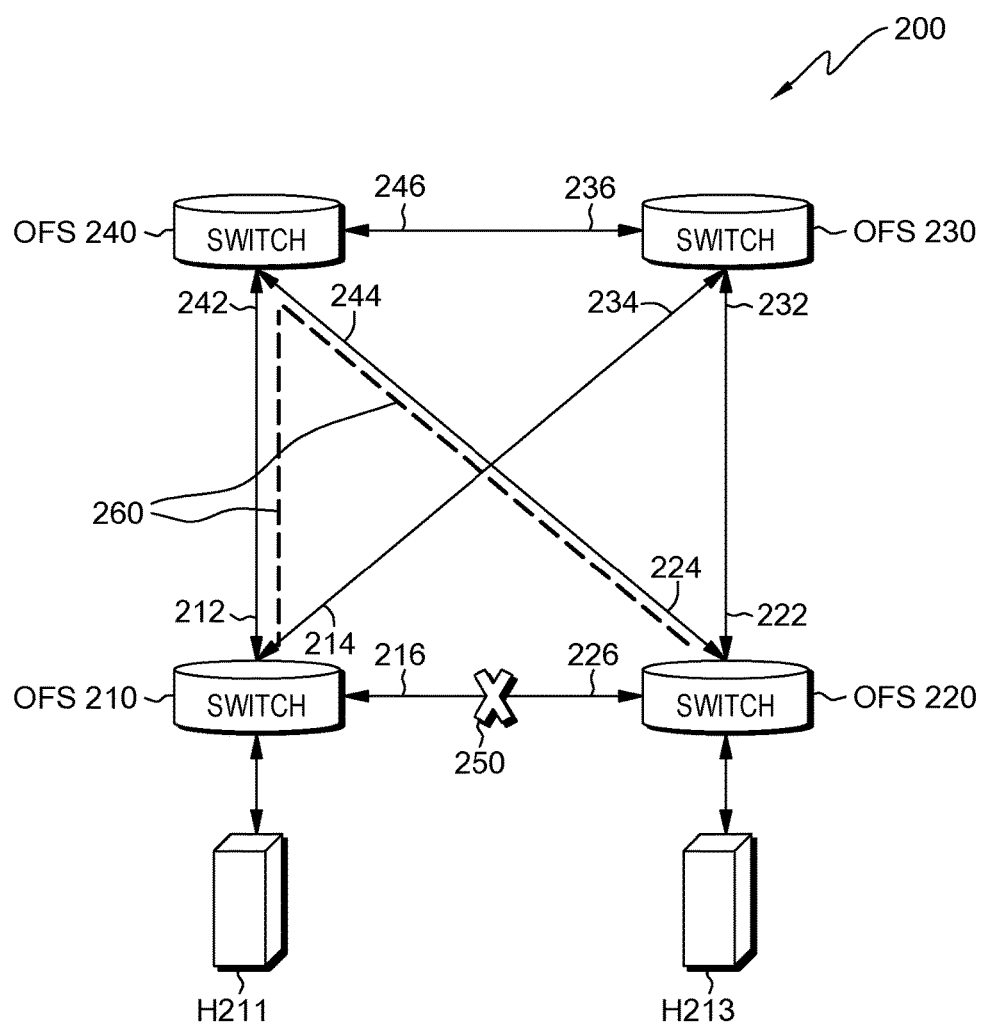
FIG. 2 is a functional block diagram illustrating depicting a portion of a software defined network (SDN), including flow path failure, in accordance with an embodiment of the present invention.

FIG. 2 is a functional block diagram depicting a portion of software defined network (SDN) 200, including a flow path failure, in accordance with an embodiment of the present invention. In a deployed SDN model, an OpenFlow SDN controller, such as controller 120, is connected to all the switches of the network by a set of separate, highly available management connections. The architectural design establishes a full view of all switches in the network path for the SDN controller, and includes the configuration mechanisms and APIs that interact with the network switches. In traditional network systems, the configurations and flow path determinations are performed on individual switch boxes.

In general, switches generate entries in their respective flow tables, based on command instructions received from an SDN controller using OpenFlow APIs. Packet headers include fields that are used to identify a pattern, referred to as a "match", and are compared to the patterns of flows entered in the flow table of the receiving switch. The flow includes an action to be taken by the switch in response to determining a match of the received packet pattern and a flow pattern included in the flow table of the switch, for example, the action to take may be "output packet", and the flow may indicate to use port 212.

The SDN 200 portion includes hosts H 211 and H 213, having connections to switches OFS 210 and OFS 220, respectively. OpenFlow switch (OFS) 210, OFS 220, OFS 230, and OFS 240. Each switch includes ports through which data packets are received or sent. OFS 210 includes ports 212, 214, and 216; OFS 220 includes ports 222, 224, and 226; OFS 230 includes ports 232, 234, and 236; and OFS 240 includes ports 242, 244, and 246. Each port is depicted as connecting to a corresponding port of another switch of SDN 200, for example port 212 of OFS 210 is connected to port 242 of OFS 240, port 214 of OFS 210 connects to port 234 of OFS 230, and so on. For simplicity and example purposes, only ports connecting to switches represented in SDN 200 are depicted, although embodiments of the present invention apply to SDNs having switch ports connecting to other switches and networks (not shown).

SDN 200 includes link fail 250 indicating a situation in which the link from port 216 of OFS 210, to port 226 of OFS 220 has failed. Packets received by OFS 210 with header patterns corresponding to a flow and action to output the received packet to port 216 are no longer actionable due to link fail 250. Controller 120 (FIG. 1), detects link fail 250 and through services 115, alternative flow 260 is generated and sent to affected switches, designating port 212, and a corresponding action of "output". Additionally, alternative flow 260 introduces port and action changes to flow tables of OFS 240 and OFS 220.

In another embodiment of the present invention, flow reaper program 300 receives alternate flow information from the input of services 115 to controller 120, along with a request for previous flow cleanup. Flow reaper program 300 applies the received alternate flow information and the flow index information to modify the current failed flow between port 216 of OFS 210 and port 226 of OFS 220 to the alternative flow of port 212 of OFS 210, to port 242 of OFS 240, to port 244 of OFS 240 to port 224 of OFS 220; thus modifying the flow by instruction to affected switches OFS 210, 220, and 240, to modify their flow tables accordingly, instead of merely deleting the previous flow that has failed.

In some embodiments of the present invention, flow reaper program 300 is initiated to clean up the previous flow and action that designated output to port 216 of OFS 210, and receive at port 226 of OFS 220, as well as flow and action that designated output to port 226 of OFS 220 and receive at port 216 of OFS 210. Additionally, all flow and action entries in flow tables for OFS 210 and OFS 220 are cleaned up by flow reaper program 300, with respect to packets received or to be sent having patterns corresponding to ports 216 and 226. In embodiments in which link fail 250 is corrected and the original link between ports 216 and 226 is re-established, flow reaper program 300 cleans up alternative flow 260 entries in the flow tables of OFS 210, OFS 240, and OFS 220, with controller 120 providing command instructions to switches OFS 210 and 220, to generate flow and action entries for ports 216 and 226, in their respective flow tables.

Figure 3:
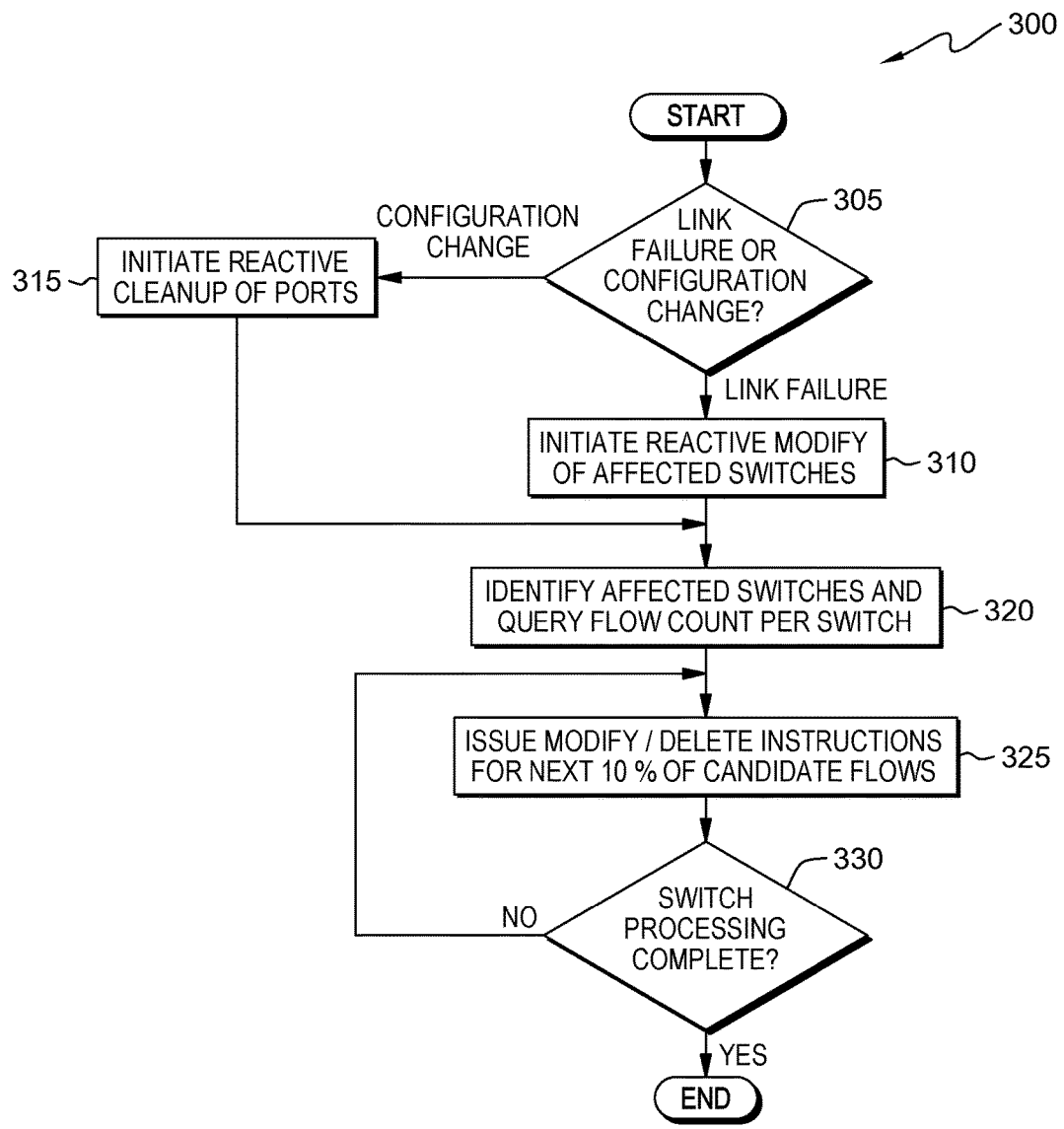
FIG. 3 illustrates operational steps of a flow reaper program, inserted on an SDN computing device within the data processing environment of FIG. 1, in accordance with an embodiment of the present invention.

FIG. 3 illustrates operational steps of a flow reaper program, inserted on an SDN computing device within the data processing environment of FIG. 1, in accordance with an embodiment of the present invention.

In decision step 305, flow reaper program 300 determines whether a link failover or configuration change has occurred within the SDN network. A link failover is the situation in which a network connection between ports of switches have failed and are no longer available for sending or receiving of data packets. An alternative flow path is required to continue processing packets that include a header pattern associated with the use of the failed ports. For example, a failover between port 216 of OFS 210 (FIG. 2) and port 226 of OFS 220 is determined, and an alternative flow is needed for packets having header patterns that are associated with ports 216 and 226, as designated by the entries of the flow tables of OFS 210 and OFS 220.

A configuration change occurs when a host component or switch of a SDN is added, substituted, or removed from the network. In some embodiments of the present invention, a host includes an originating or terminating port for some data packets of the SDN. In response to adding, substituting, or removing a host, a controller of the SDN generates command instructions to the SDN switches that have connections to the affected host to add alternative flow entries to their respective flow tables.

Similarly, the addition, substitution, or removal of an SDN switch initiates instructions from the controller to the SDN switches affected by the change, to make entries in their respective flow tables corresponding to the switch change. For example, switch OFS 230 of FIG. 2 may be replaced with a new switch OFS (not shown), that includes ports corresponding to previous ports 282, previous port 232, previous port 234; and port previous port 236. Controller 120 (FIG. 1) provides instructions to switches OFS 210, 220, 240, and 280, to add entries to their respective flow tables that correspond to the port changes from the replacement of OFS 230 with OFS 280.

In response to receiving notification determining that a configuration change occurs in step 305, flow reaper program 300 proceeds to step 315 and initiates a reactive cleanup of ports affected by the configuration change. Flow reaper program 300 is initiated to perform a cleanup of flows and actions in response to the detected configuration change, and proceeds to prepare the cleanup to be performed as a background activity.

In step 320 flow reaper program 300 identifies the affected switches and queries the flow count per affected switch. Flow reaper program 300 maintains an index of the flows associated with each flow-match pattern for each switch in the SDN, in a local cache. An identified pattern maps to a switch identifier and additional cached values of mac addresses map to a list of flows affected by the mac address. Accessing flow information from cached index mappings provides a fast fetch of affected flows, supporting low-latency.

Each flow includes two components, a match and a corresponding set of actions. A match in a flow table describes a particular set of values for a set of fields. The match is compared to header fields of the data packet, and data packet headers corresponding to the field values of the match of a flow will have the action associated with the flow applied to the data packets. In some embodiments of the present invention, the data packet header includes a ten-tuple set of fields that identify a flow: in-port; source mac address (src-mac); source IP (src-ip); destination IP (dst-ip); destination mac address (dst-mac); Ethernet type (eth-type); VLAN id; protocol; source port (src-14-port); destination port (dst-14-port); and specific values or wildcards may be used to establish a pattern of a match.

Flow reaper program 300 queries the flow tables of affected switches to obtain a flow count affected by the detected network change. The flow count is used by flow reaper program 300 during cleanup processing to determine when all affected flows have been cleaned up.

In step 325 flow reaper program 300 issues instructions to modify or delete the next configurable portion, or percentage of candidate flows for each affected switch of the SDN. For a configuration change determined in step 305, flow reaper program 300 issues delete instructions for a configurable percentage of the flows of switches affected by the change.

For example, ten percent of the flows of each switch of the SDN would receive instructions from flow reaper program 300 to delete particular flows from their respective flow tables. Flow reaper program 300 performs a sweep across all switches of the SDN and deletes up to the configurable percentage limit of flows (e.g. ten percent), to be removed on each visited switch. The cleanup is limited to the configurable percentage of flows affected by the change, which are also referred to as candidate flows. The limitation of flow cleanup to a configurable percentage of total flows affected avoids starving other switches from cleanup due to a particular switch with a large number of candidate flows.

For example, flow reaper program 300 has determined that a configuration change has occurred with respect to switch OFS 210 of SDN 200 (FIG. 2). Flow reaper program 300 issues delete instructions for a portion of the candidate flows (e.g. 10%) on each of the switches of SDN 200, affected by link fail 250, which, based on the cache of flows maintained by flow reaper program 300, may include flows in the flow tables of OFS 210, OFS 220, OFS 230, and OFS 240.

In step 330 flow reaper program 300 determines if the processing of affected switches is complete, and determining that the processing of affected switches is not complete, following the NO branch of step 330, flow reaper program 300 returns to step 325 and instructs the modification or cleanup of the next configurable percentage of candidate flows. For example, once the first 10% of flows have been deleted, flow reaper program 300 repeats the sweep of all affected switches of SDN 200, and deletes the next 10% of affected flows across all switches of the network, and proceeds as in this manner, based on the queried counts of flows affected, until all affected flows have been deleted. In step 330, "YES" branch, in which flow reaper program 300 determines that all switch processing is complete, flow reaper program 300 ends.

Returning to step 305 in which flow reaper program 300 determines whether the change to the network is a link failure or a configuration change to be a link fail, and in response to receiving notification that a link failure has occurred, in some embodiments of the present invention, flow reaper program 300 proceeds to step 310 and initiates a reactive modification of switches and ports affected by the link failure, sometimes referred to as a link failover. In some embodiments of the present invention, flow reaper program 300 initiates a reactive modify of the affected switches, in which flow reaper program 300 uses the maintained cache of indexed flow mappings associated with the switches of the SDN and input from services 115 in conjunction with controller 120, to prepare to modify flows affected by the link failure. In other embodiments in which flow reaper program 300 has not received flow modification instructions from services connected to the SDN controller, flow reaper program 300 prepares for cleanup, deleting the previous flows affected by the link failure.

Flow reaper program 300 proceeds to step 320 and performs identification of affected switches and queries the affected flow count of each affected switch, as described above. In step 325, for some embodiments of the present invention, flow reaper program 300 issues a modify instruction for a configurable percentage of the candidate flows. In some embodiments of the present invention, services 115 provides flow reaper program 300 with alternate port usage information for the affected switches, along with requests to initiate a cleanup of previous flows. The alternate port information enables flow reaper program 300 to perform a modification of affected flows instead of performing a deletion. In other embodiments, in which flow reaper program 300 does not receive alternate port use information, a configurable percentage of affected flows are deleted from the flow tables of affected switches, based on the maintained cache of flows of flow reaper program 300. Flow reaper program 300 performs a sweep across all affected switches of the SDN and performs a modification of flows, in one embodiment, or a delete of flow in another embodiment, for the initial configurable percentage of flows, for example, a first ten percent of flows for each affected switch.

Flow reaper program 300 determines if switch flow processing is complete in step 330, and proceeds as described above. In response to determining that all flows of affected switches having been processed, flow reaper program 300 ends.

Figure 4:
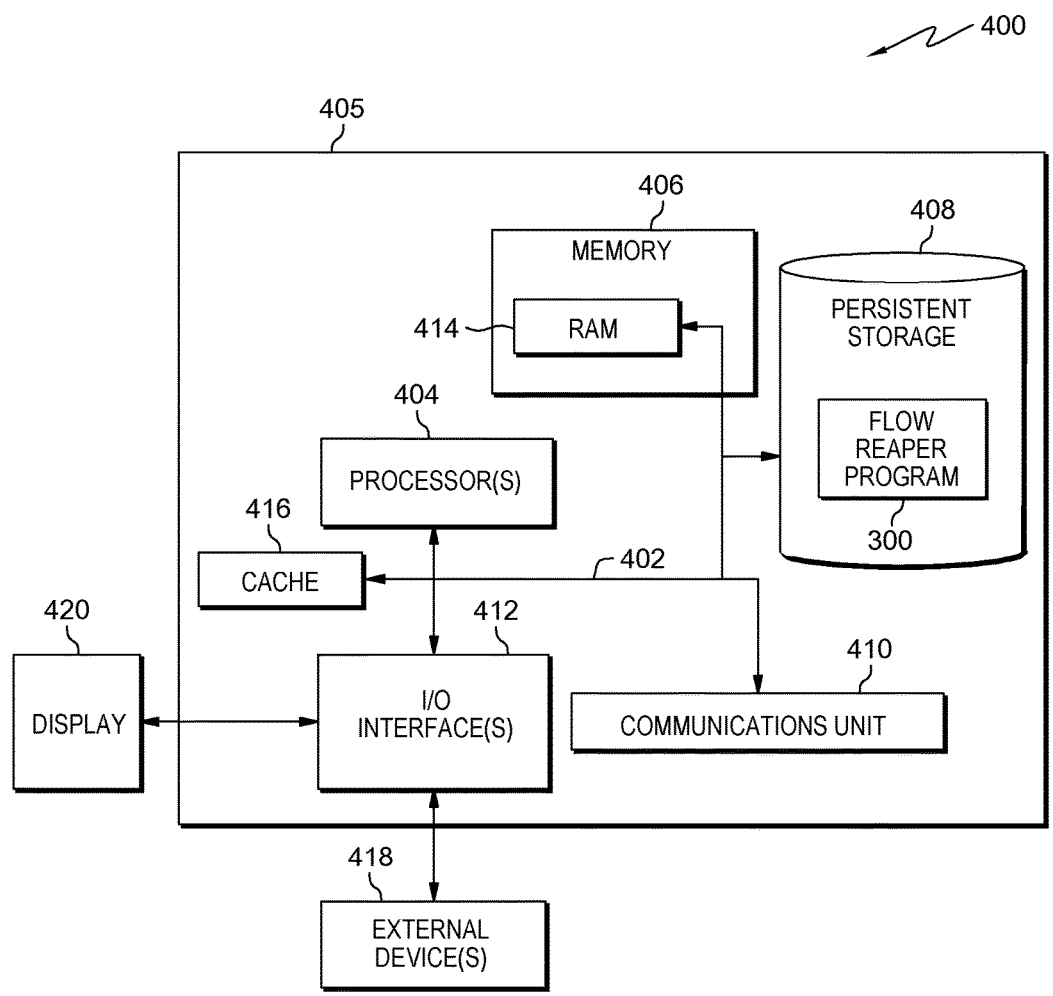
FIG. 4 depicts a block diagram of components of a SDN computing device capable of operationally performing the flow reaper program, in accordance with an embodiment of the present invention.

FIG. 4 depicts a block diagram of components of computing system 400, including computing device 405, capable of operationally performing the flow reaper program 300, in accordance with an embodiment of the present invention.

Computing device 405, includes components and functional capability similar to SDN computing device 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

Flow reaper program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed network processing environment 100 and computing devices 130 and 140. In these examples, communications unit 410 includes one or more network interface cards. Communications unit 410 may provide communications through the use of either or both physical and wireless communications links. Flow reaper program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., flow reaper program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing flows of a software-defined network, the method comprising:
a controller of a software-defined network receiving a notification of a change to a configuration of a plurality of data delivery devices of the network;
responsive to receiving the notification of the change to the configuration of one or more data delivery devices of the plurality of data delivery devices, the controller determining whether one or more flows of respective flow tables of the plurality of data delivery devices are affected as a result of the change to the configuration, by matching indexes of flow mappings of the plurality of data delivery devices maintained in a memory of the controller, to a pattern of information fields and actions that corresponds to the received notification of the change to the configuration; and
the controller sending instructions to the one or more data delivery devices affected by the change to the configuration to perform an asynchronous activity on the respective flow tables, wherein the asynchronous activity includes a cleanup of the one or more flows of the respective flow tables of the one or more data delivery devices affected by the change to the configuration, and wherein the cleanup is performed in repetitive sweeps of the one or more data delivery devices as a background activity, until completion of the cleanup.

2. The method of claim 1, wherein the one or more data delivery devices of the plurality of delivery devices of the software-defined network include a set of one or a combination of network switches and network routers, each applying a software-defined network protocol providing access over the software defined network to a forwarding plane of the set of one or a combination of network switches and network routers.

3. The method of claim 1, wherein the change to the configuration of the software-defined network results from a failure of a link of one or more ports of a data delivery device of the plurality of data delivery devices of the software-defined network, and the cleanup includes performing a modification of the one or more flows included in the respective flow tables of the plurality of data delivery devices of the software-defined network that is affected as a result of the change to the configuration of the software-defined network, based on alternate pattern and action information provided by a network service application.

4. The method of claim 1, wherein the cleanup includes one or more actions selected from the group consisting of: removal of the one or more flows from the flow table of at least one of the one or more data delivery devices affected as a result of removal of a delivery device from the software-defined network, addition of one or more flows to the flow tables of the one or more data delivery devices affected as a result of an addition of a data delivery device to the software-defined network, modification of one or more flows to the flow tables of the one or more data delivery devices affected as a result of changes to an Internet Protocol (IP) or media access control (MAC) address of a data delivery device of the software-defined network.

5. The method of claim 1, wherein the cleanup of the one or more flows of the respective flow tables of the one or more data delivery devices affected by the change to the configuration of the software-defined network, includes a sweep across all of the plurality of data delivery devices of the software-defined network in which the asynchronous activity is performed in a background operation on a configurable portion of the one or more flows of the one or more data delivery devices affected by the change to the configuration of the software-defined network, the sweep being repeated until the asynchronous activity completes cleanup of the one or more flows of the delivery devices.

6. The method of claim 1, wherein the flow mappings maintained in the memory of the controller that contain the pattern of information fields and actions of a flow of the respective flow tables of the one or more data delivery devices affected by the change to the configuration of the plurality of data delivery devices, match the pattern of information fields and actions of a failed delivery of a data packet.

7. The method of claim 1, wherein the change to the configuration of the plurality of data delivery devices of the software-defined network includes sending link layer discovery protocol packets as a mechanism to discover existing edges of the software-defined network, and determining a change of the configuration by comparison to subsequent link layer discovery protocol packet responses.

8. The method of claim 1, wherein the change to the configuration of the plurality of the one or more data delivery devices of the software-defined network includes one or a combination selected from a group consisting of: an addition of a data delivery device from a topology of the software-defined network, a removal of a data delivery device from a topology of the software-defined network.

9. The method of claim 8, wherein determination of the change to the configuration of the plurality of data delivery devices of the software-defined network is based on the controller sending link layer discovery protocol packets through the software-defined network to identify changes to the topology of the software-defined network.

10. A computer program product for managing flows of a software-defined network, the computer program product comprising:
one or more computer readable storage media wherein the computer readable storage medium is not a transitory signal per se, and program instructions stored on the one or more computer readable storage media, the program instructions comprising:
program instructions to receive within an software-defined network, a notification of a change to a configuration of a plurality of data delivery devices of the network;
responsive to receiving the notification of the change to the configuration of one or more data delivery devices of the plurality of data delivery devices, program instructions to determine whether one or more flows of respective flow tables of the plurality of data delivery devices are affected as a result of the change to the configuration, by matching indexes of flow mappings of the plurality of data delivery devices maintained in a memory of the controller, to a pattern of information fields and actions that corresponds to the received notification of the change to the configuration; and program instructions to send to the one or more data delivery devices affected by the change to the configuration to perform an asynchronous activity on their respective flow tables, wherein the asynchronous activity includes a cleanup of the one or more flows of the respective flow tables of the one or more data delivery devices affected by the change to the configuration, wherein the cleanup is performed in repetitive sweeps of the one or more data delivery devices as a background activity, until completion of the cleanup.

11. The computer program product of claim 10, wherein the program instructions to receive the notification of the change to the configuration of the software-defined network is in response to determining a failure of a link of one or more ports of a first data delivery device of the plurality of data delivery devices of the software-defined network, and the cleanup includes performing a modification of the one or more flows included in the respective flow tables of the first data delivery device that is affected as a result of the failure of the link of the one or more ports of the first delivery device, based on alternate pattern and action information provided by a network service application.

12. The computer program product of claim 10, wherein the cleanup includes one or more actions selected from the group of: removal of the one or more flows from the respective flow tables of at least one of the one or more data delivery devices affected as a result of removal of a data delivery device from the software-defined network, addition of one or more flows to the respective flow tables of the one or more delivery devices affected as a result of addition of a delivery device to the software-defined network, modification of one or more flows to the respective flow tables of the one or more data delivery devices affected as a result of changes to an Internet Protocol (IP) or media access control (MAC) address of a delivery device of the software-defined network.

13. The computer program product of claim 10, wherein the program instructions to clean up the one or more flows of the respective flow tables of the one or more data delivery devices affected by the change to the configuration of the software-defined network, includes a sweep across all of the plurality of data delivery devices of the software-defined network in which the asynchronous activity is performed in a background operation on a configurable portion of the one or more flows of the one or more data delivery devices affected by the change to the configuration of the software-defined network, the sweep being repeated until the asynchronous activity completes cleanup of the one or more flows of the delivery devices.

14. The computer program product of claim 10, wherein the program instructions to change the configuration of the plurality of delivery devices of the software-defined network includes sending link layer discovery protocol packets as a mechanism to discover existing edges of the software-defined network, and determining a change of the configuration by comparison to subsequent link layer discovery protocol packet responses.

15. A computer system for managing flows of an software-defined network, the computer system comprising:
one or more computer processors, one or more computer readable storage media, program instructions stored on the computer readable storage media for execution by at least one of the one or more processors, the program instructions comprising:

program instructions to receive within an software-defined network, a notification of a change to a configuration of a plurality of data delivery devices of the network;

responsive to receiving the notification of the change to the configuration of one or more data delivery devices of the plurality of data delivery devices, program instructions to determine whether one or more flows of respective flow tables of the plurality of data delivery devices are affected as a result of the change to the configuration, by matching indexes of flow mappings of the plurality of data delivery devices maintained in a memory of the controller, to a pattern of information fields and actions that corresponds to the received notification of the change to the configuration; and program instructions to send to the one or more data delivery devices affected by the change to the configuration to perform an asynchronous activity on their respective flow tables, wherein the asynchronous activity includes a cleanup of the one or more flows of the respective flow tables of the one or more data delivery devices affected by the change to the configuration, wherein the cleanup is performed in repetitive sweeps of the one or more data delivery devices as a background activity, until completion of the cleanup.

16. The computer system claim 15, wherein the one or more data delivery devices of the plurality of delivery devices of the software-defined network include a set of one or a combination of network switches and network routers, each applying an OpenFlow network protocol providing access over the software-defined network to a forwarding plane of the set of one or a combination of network switches and network routers.

17. The computer system of claim 15, wherein the program instructions to receive the notification of the change to the configuration of the software-defined network is in response to determining a failure of a link of one or more ports of a first data delivery device of the plurality of data delivery devices of the software-defined network, and the cleanup includes performing a modification of the one or more flows included in the respective flow tables of the first data delivery device that is affected as a result of the failure of the link of the one or more ports of the first delivery device, based on alternate pattern and action information provided by a network service application.

18. The computer system of claim 15, wherein the change to the configuration of the software-defined network is in response to a change to a topology of the plurality of data delivery devices of the software-defined network, and the asynchronous activity includes performing a cleanup of the one or more flows included in the respective flow tables of at least one of the one or more data delivery devices of the plurality of data delivery devices that are affected by the change to the topology, and wherein the cleanup includes removal of the one or more flows from the flow table of at least one of the one or more data delivery devices affected by the change to the configuration of the software-defined network.

19. The computer system of claim 15, wherein the asynchronous activity includes a sweep across the plurality of delivery devices of the software-defined network in which the asynchronous activity is performed in a background on a configurable portion of the one or more flows affected by the failure of the first delivery device, the sweep being repeated until the asynchronous activity is performed on the one or more flows affected by the failure of the first delivery device.

20. The computer system of claim 18, wherein determining the change to the topology configuration of the plurality of delivery devices of the software-defined network includes sending link layer discovery protocol packets as a mechanism to discover existing edges of the software-defined network, and determining the change of the topology configuration by comparison to subsequent link layer discovery protocol packet responses.

\* \* \* \* \*